H. N. MOORE.
BRAKE.
APPLICATION FILED AUG. 18, 1917.
1,300,634.
Patented Apr. 15, 1919.
2 SHEETS—SHEET 2.
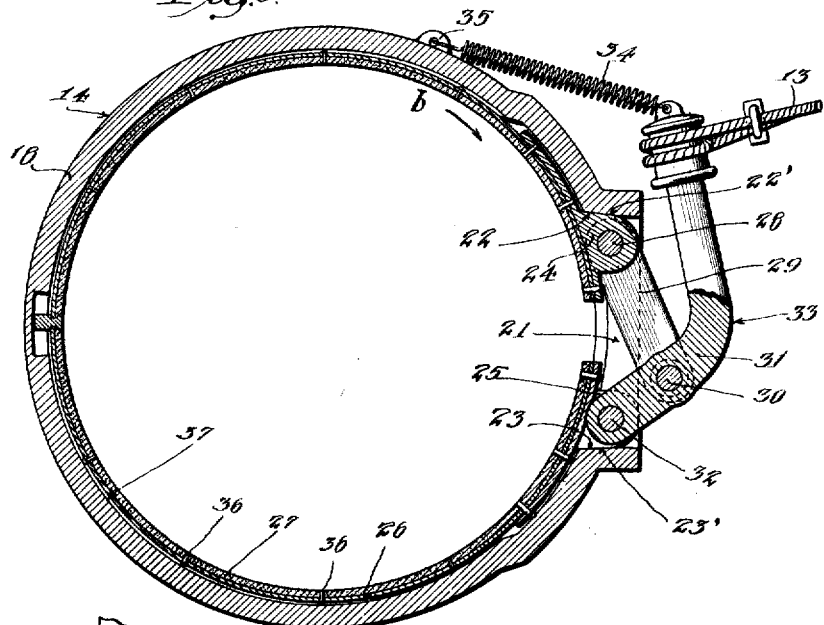
Inventor
Henry N. Moore
By Frederick Lyon
atty
Witnesses:
Sully Russo
Leonard Lyon

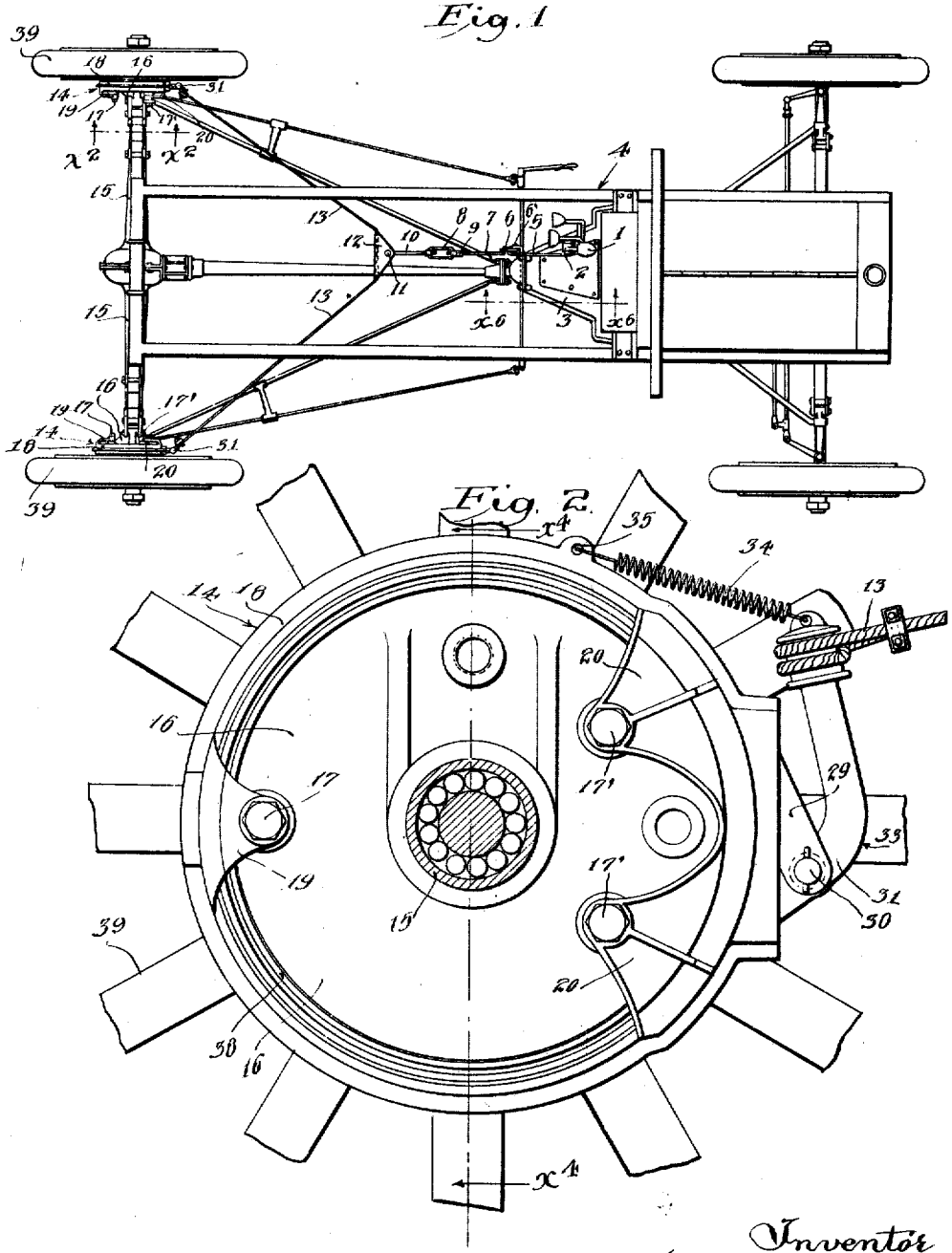

UNITED STATES PATENT OFFICE.

HENRY N. MOORE, OF LOS ANGELES, CALIFORNIA, ASSIGNOR OF ONE-THIRD TO ETHAN C. LE MUNYON AND ONE-THIRD TO FRANK E. ECKHART, BOTH OF LOS ANGELES, CALIFORNIA.

BRAKE.

1,300,634.     Specification of Letters Patent.     Patented Apr. 15, 1919.

Application filed August 18, 1917. Serial No. 186,918.

*To all whom it may concern:*

Be it known that I, HENRY N. MOORE, a citizen of the United States, residing at Los Angeles, in the county of Los Angeles and State of California, have invented a new and useful Brake, of which the following is a specification.

This invention pertains to brakes of the character employing brake bands adapted to frictionally engage and retard a rotating member and an object of the invention is to obtain maximum area of contact of the friction surface of the brake band with the rotary member.

Another object of the invention is to so construct the brake that the brake band will be applied progressively from end to end in the direction in which the rotating member is turning, and to obtain this effect regardless of which direction the rotating member is turning.

Other objects and advantages will appear in the subjoined detail description.

The accompanying drawings illustrate the invention:

Figure 1 is a plan view of a chassis of a motor vehicle equipped with a pair of the newly invented brakes.

Fig. 2 is a side elevation of the invention from line indicated by $x^2$—$x^2$, Fig. 1.

Fig. 3 is a sectional elevation of the brake shown in Fig. 2, omitting the axle housing, brake drum, wheel and axle.

Fig. 4 is an elevation mainly in section on line indicated by $x^4$—$x^4$, Fig. 2, the axle housing being omitted.

Fig. 5 is an edge view of the brake band and its operating lever and arms, the lever being partly broken away and the spring being omitted for clearness of illustration.

Fig. 6 is an enlarged side elevation from line indicated by $x^6$—$x^6$, Fig. 1.

There is provided a brake-operating lever in the form of a foot pedal indicated at 1 of any suitable construction and said lever is pivotally mounted and in the instance shown is pivoted at 2 to the change speed housing 3 which is mounted on the chassis 4 of the motor vehicle. This chassis may be of any suitable construction and in the instance shown in Fig. 1 is the chassis of a Ford car.

The lever 1 is connected by a rod 5 to a stroke multiplying lever 6 which is fulcrumed at 6′ to the housing 3 or other suitable support and which in turn is connected by a rod 7 to a turn buckle 8, there being a lock nut 9 on the rod 7 to lock the turn buckle 8 in adjusted position. The turn buckle 8 is connected to a rod 10 which is pivoted at 11 to a channeled member 12 through which is rove a cable 13. The opposite ends of the cable 13 are fastened to the brakes indicated in general by the character 14.

The brakes 14 are of like construction and therefore only one of them needs be described and said brake is constructed as follows: The axle housing 15 of the chassis is provided at one end with a flange 16 and fastened to said flange by bolts 17, 17′ is a continuous annular brake housing 18, said housing being provided with an ear 19 through which the bolt 17 passes and being provided with ears 20 through which the bolts 17′ pass. These bolts 17, 17′ may be the same ones employed in fastening the ordinary brake and radius rod in place on the Ford car in a manner well understood.

The housing 18 is provided at one side with a slot 21, expanding slightly inwardly owing to the end walls being aslant outward toward one another, and said end walls form stops 22, 23 respectively to engage abutments formed by the faces 22′, 23′ of lugs 24, 25 respectively of a brake band 26. When the brake band 26 is fully expanded within the housing 18 so as to contact with the inner face of the housing the faces 22′, 23′ are in engagement with the stops 22, 23 respectively. The brake band 26 may be faced with any suitable friction producing material, as indicated at 27, in a manner well understood in the art pertaining to band brakes.

The lug 24 is pivoted at 28 to a pair of links 29 which in turn are pivoted at 30 on the opposite sides of a lever 31 that is pivoted at 32 to the lug 25, said lug being cleft so that the lever 31 will be inserted in the cleft. The outer faces of the inner portions of the links 29 and the outer faces of the lug 25 slide along the sides of the slot and are guided thereby. The lever 31 is provided with a bend at 33 so that the outer portion of the lever is at a considerable angle to the inner portion having the pivots 30, 32. When the lug faces 22′, 23′ engage the stops 22, 23 the outer end of the lever 31 lies close to the housing 18. The outer end of the lever 31 is connected with one end of the cable 13 and said end of the lever is connected by a retracting coil spring 34 to a suitable fixed point such, for instance, as an ear 35 on the periphery of the housing 18. This spring 34 tends to hold the lever 33 in such position as to expand the brake band 26 against the housing 18. It is clear that by reason of the housing 18 being continuous and the brake band seating thereagainst when in expanded position all rattling will be prevented and heat will readily pass from the brake band to the housing 18 and will be effectively radiated by said housing; thus the housing tends to cool the brake band so as to minimize tendency of the brake band to become overheated, which overheating is detrimental to the friction material 27. The material 27 may be fastened to the brake band 26 by rivets 36 or equivalents and to insure that the outer ends of the rivets do not hold the brake band away from the housing 18 when the brake band is expanded the housing 18 is provided internally with an annular groove 37 into which the heads of the rivets 36 may protrude so that the brake band will seat snugly against the inner face of the housing at both sides of the groove.

When the brake band 26 is contracted it frictionally engages a brake drum 38 which is fast on the wheel 39 of the chassis.

In practice when it is desired to retard the vehicle the lever 1 will be moved in the direction of the arrow $a$, Fig. 6, so as to move the lever 6 and rod 7, and it is noted that owing to the rod 5 being connected to the lever 6 nearer its pivot than the rod 7 that the stroke of the rod 7 will be greater than the stroke of the rod 5. Thus with a comparatively small movement of the lever 1 the lever 33 will be given considerable angular movement.

If it be assumed, for example, that the brake drum is rotating in the direction of the arrow $b$, Fig. 3, the lug face 23' will be caused to engage the stop 23 and braking movement of the lever 33, aided by the friction of the drum on the band facing, will cause the lug face 23' to slide inward along the stop 23 until the band facing engages the brake drum. Thus, contact of the band with the drum occurs first adjacent the lug 25. Further braking movement of the lever 33 will move the pivot 28 toward the pivot 32 thus contracting the brake band and therefore causing the contact of the brake band with the drum to move progressively from the end adjacent the pivot 32 to the end adjacent the pivot 28. Thus the rotating brake drum tends to wrap the brake band around it in the direction of rotation so that when the lever 33 is thrown to its full braking position full contact is obtained between the brake band and the drum.

Assuming that the direction of rotation of the brake drum is opposite to the direction indicated by the arrow $b$, Fig. 3, the face 22' will be forced against the stop 22 and braking movement of the lever 33, aided by the friction of the drum on the brake band facing, will cause the face 22' to slide inward along the stop 22 until the band facing engages the drum. Thus it is clear that engagement of the band with the drum first takes place adjacent the pivot 28 and that further braking movement of the lever 33 will move the pivot 32 toward the pivot 28 to contract the brake band, thus causing the contact of the band with the drum to move progressively from the end adjacent the pivot 32 toward the end adjacent the pivot 28.

Thus as before the rotating drum tends to wrap the brake band around it in the direction of rotation so that when the lever 33 is thrown to its full braking position full contact is obtained between the brake band and the drum.

Thus it is clear that the brake works with equal facility regardless of the direction of rotation of the brake drum and that owing to contact of the brake band with the drum substantially from end to end of the band when the lever 33 is moved to full braking position the brake is 100% efficient in its braking power.

I claim:

In combination, a chassis having axle housing flanges, annular brake housings having ears, radius rods, bolts fastening the radius rods to two of the ears of the respective housings and fastening said ears to the flanges, wheels for the chassis, brake drums on the wheels respectively inside of the housing flanges, brake bands between the housing flanges and brake drums, and means to contract the brake bands on the drums.

Signed at Los Angeles, California, this 13th day of August, 1917.

HENRY N. MOORE.

Witnesses:
GEORGE H. HILES,
A. F. SCHMIDTBAUER.

Copies of this patent may be obtained for five cents each, by addressing the "Commissioner of Patents, Washington, D. C."